US012407128B2

(12) United States Patent
Masuda et al.

(10) Patent No.: US 12,407,128 B2
(45) Date of Patent: Sep. 2, 2025

(54) CONNECTOR WITH IMPROVED INSULATING CAPABILITIES

(71) Applicants: Yazaki Corporation, Tokyo (JP); Mitsubishi Jidosha Kogyo Kabushiki Kaisha, Tokyo (JP)

(72) Inventors: Satoki Masuda, Shizuoka (JP); Hikaru Oi, Shizuoka (JP); Tomohiro Jintoku, Tokyo (JP); Kanato Kimura, Tokyo (JP); Masaharu Yamagishi, Aichi (JP); Kazuhiro Okamura, Aichi (JP)

(73) Assignees: YAZAKI CORPORATION, Tokyo (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 439 days.

(21) Appl. No.: 18/081,785

(22) Filed: Dec. 15, 2022

(65) Prior Publication Data

US 2023/0124316 A1 Apr. 20, 2023

Related U.S. Application Data

(63) Continuation of application No. PCT/JP2021/025804, filed on Jul. 8, 2021.

(30) Foreign Application Priority Data

Jul. 15, 2020 (JP) ................................ 2020-121258

(51) Int. Cl.
*H01R 13/52* (2006.01)
*H01R 13/658* (2011.01)

(52) U.S. Cl.
CPC ..... *H01R 13/5202* (2013.01); *H01R 13/5216* (2013.01); *H01R 13/658* (2013.01)

(58) Field of Classification Search
CPC ............ H01R 13/5202; H01R 13/5205; H01R 13/5219; H01R 13/5221; H01R 13/74–748; H01R 33/965; H01R 13/6596
See application file for complete search history.

(56) References Cited

U.S. PATENT DOCUMENTS

2015/0288090 A1* 10/2015 Shigeta .............. H01R 13/5202 439/587
2015/0364856 A1* 12/2015 Nakai .................. H01B 17/583 174/152 G (Continued)

FOREIGN PATENT DOCUMENTS

JP 2016-071982 A 5/2016
WO 2015/108201 A1 7/2015

*Primary Examiner* — Tulsidas C Patel
*Assistant Examiner* — Carlos E Lopez-Pagan
(74) *Attorney, Agent, or Firm* — Sughrue Mion, PLLC

(57) ABSTRACT

A connector includes a housing having a fitting part that is inserted and fitted into a counterpart fitting part, a shield shell having a shell flange part disposed opposite a wall surface of a counterpart wall body with an interval therebetween, a first watertight member between the fitting part and the counterpart fitting part, and a second watertight member that is crushed between the shell flange part and a wall surface of the counterpart wall body. The housing has a housing flange part with an outer peripheral surface thereof disposed inside an outer peripheral edge of the shell flange part and outside an inner edge of the shell flange part, and with a contact surface with an annular shape in contact with the wall surface of the counterpart wall body.

6 Claims, 7 Drawing Sheets

(56) References Cited

U.S. PATENT DOCUMENTS

| | | | | |
|---|---|---|---|---|
| 2016/0172784 | A1* | 6/2016 | Kataoka | H01R 13/5219 439/271 |
| 2016/0329651 | A1* | 11/2016 | Yamaguchi | H01R 13/44 |
| 2017/0302019 | A1 | 10/2017 | Horiuchi et al. | |
| 2018/0019544 | A1* | 1/2018 | Ishibashi | H02K 11/30 |
| 2018/0358748 | A1* | 12/2018 | Yamanashi | H01R 24/62 |
| 2018/0366851 | A1 | 12/2018 | Garcia et al. | |

* cited by examiner

CONNECTOR WITH IMPROVED INSULATING CAPABILITIES

CROSS-REFERENCE TO RELATED APPLICATION

This application is a continuation application of International Application No. PCT/JP2021/025804 filed on Jul. 8, 2021 which claims the benefit of priority from Japanese Patent Application No. 2020-128258 filed on Jul. 15, 2020 and designating the U.S., the entire contents of which are incorporated herein by reference.

BACKGROUND OF THE INVENTION

1. Field of the Invention

The present invention relates to a connector.

2. Description of the Related Art

Conventionally, shielded connectors are known that include a housing in which a fitting part is inserted and fitted into a counterpart fitting part with a bore shape provided on a counterpart wall body, and a shield shell that covers a protruding portion protruding from the counterpart fitting part in the housing from an outside. In this connector, the shield shell is fixed to the counterpart wall body. For example, the shield shell is known that has a cylindrical part that covers the protruding part of the housing from the outside, a flange part that is disposed opposite a wall surface of the counterpart wall body, and a fixed part that is bent from an end of the flange part and fixed to an end surface of the counterpart wall body. This type of connector is disclosed, for example, in Japanese Patent Application Laid-open No. 2016-71982.

By the way, in such conventional connectors, if liquid such as water enters between the flange part of the shield shell and the wall surface of the counterpart wall body, the liquid may be transmitted through therebetween, to a gap between the fitting part and the counterpart fitting part, and the liquid may reach a terminal metal fitting. To avoid this possibility, conventional connectors are provided with a watertight member with an annular shape that seals a cylindrical gap between the fitting part and the counterpart fitting part. In conventional connectors, the watertight member prevents liquid that has entered between the fitting part and the counterpart fitting part from flowing out to a terminal metal fitting side. However, in connectors, if liquid tightness between the fitting part and the counterpart fitting part is to be considered, it is desirable to reduce an amount of liquid flowing into the gap therebetween.

SUMMARY OF THE INVENTION

It is an object of the present invention to provide a connector capable of reducing the amount of liquid flowing between fitting parts.

In order to achieve the above mentioned object, a connector according to one aspect of the present invention includes a terminal metal fitting attached to an end of a wire; a housing having a fitting part that accommodates the terminal metal fitting inside thereof and that is inserted and fitted into a counterpart fitting part with a bore shape of a counterpart wall body; a shield shell including a cylindrical part that covers, from outside, a protruding portion of the housing that protrudes from the counterpart fitting part on an opposite side of an insertion direction of the fitting part to the counterpart fitting part, and a shell flange part that protrudes outward beyond an outer peripheral surface of the cylindrical part and is disposed opposite a wall surface of the counterpart wall body with an interval therebetween; a first watertight member with an annular shape that is attached to an outer peripheral wall surface of the fitting part and covers a cylindrical gap between the fitting part and the counterpart fitting part in a fitting state where the fitting part is inserted and fitted into the counterpart fitting part; and a second watertight member with an annular shape that is crushed between the shell flange part and the wall surface of the counterpart wall body when in the fitting state, wherein the housing has a housing flange part that is interposed between the shell flange part and the wall surface of the counterpart wall body when in the fitting state, and an outer peripheral surface is disposed inside an outer edge of the shell flange part and outside an inner edge of the shell flange part, the housing flange part has a contact surface with an annular shape that contacts the wall surface of the counterpart wall body when in the fitting state, and the second watertight member is disposed outside of the housing flange part and has an inner peripheral surface disposed opposite the outer peripheral surface of the housing flange part and a pressurized surface with an annular shape that protrudes to the insertion direction side beyond the contact surface of the housing flange part and is subjected to a pressing force from the wall surface of the counterpart wall body when in the fitting state.

According to another aspect of the present invention, in the connector, it is desirable that an amount of protrusion from the contact surface of the housing flange part in the second watertight member is greater than a sum of a maximum value of relative movement amount in the insertion direction between the shield shell and the counterpart wall body and a cumulative tolerance of a gap in the insertion direction between the shell flange part and the wall surface of the counterpart wall body.

According to still another aspect of the present invention, in the connector, it is desirable that the shield shell has a fixed part that is bent from an end of the outer peripheral edge of the shell flange part and fixed to an end surface of the counterpart wall body.

According to still another aspect of the present invention, in the connector, it is desirable that the second watertight member is attached to the shell flange part.

According to still another aspect of the present invention, in the connector, it is desirable that the second watertight member is made of an ethylene propylene diene rubber.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following is a detailed description of an embodiment of a connector according to the present invention with reference to the drawings. The invention is not limited to this embodiment.

Embodiment

One embodiment of the connector according to the present invention is described with reference to FIGS. 1 to 7.

Figure 1:
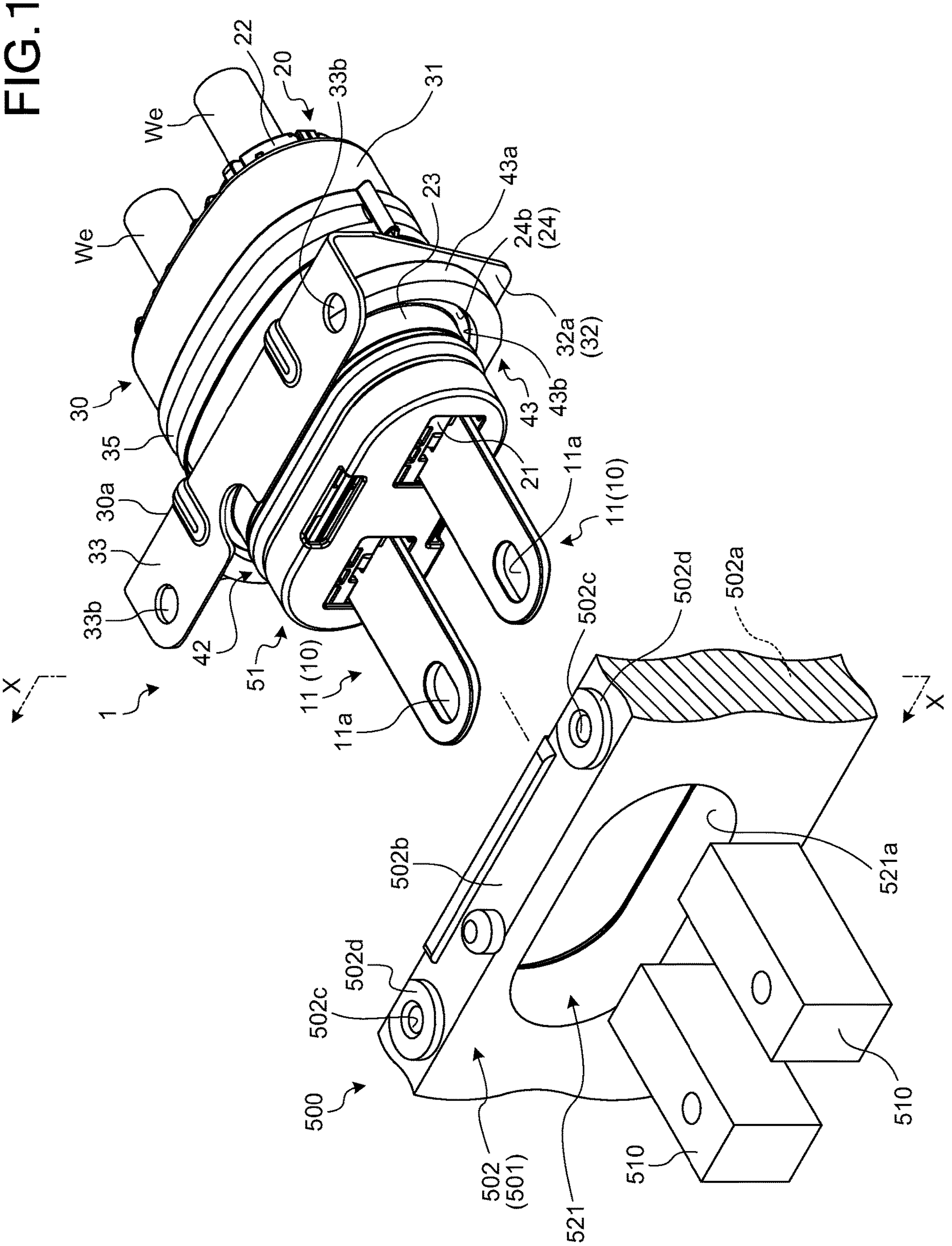
FIG. 1 is a perspective diagram before fitting illustrating a connector of an embodiment.
Figure 2:
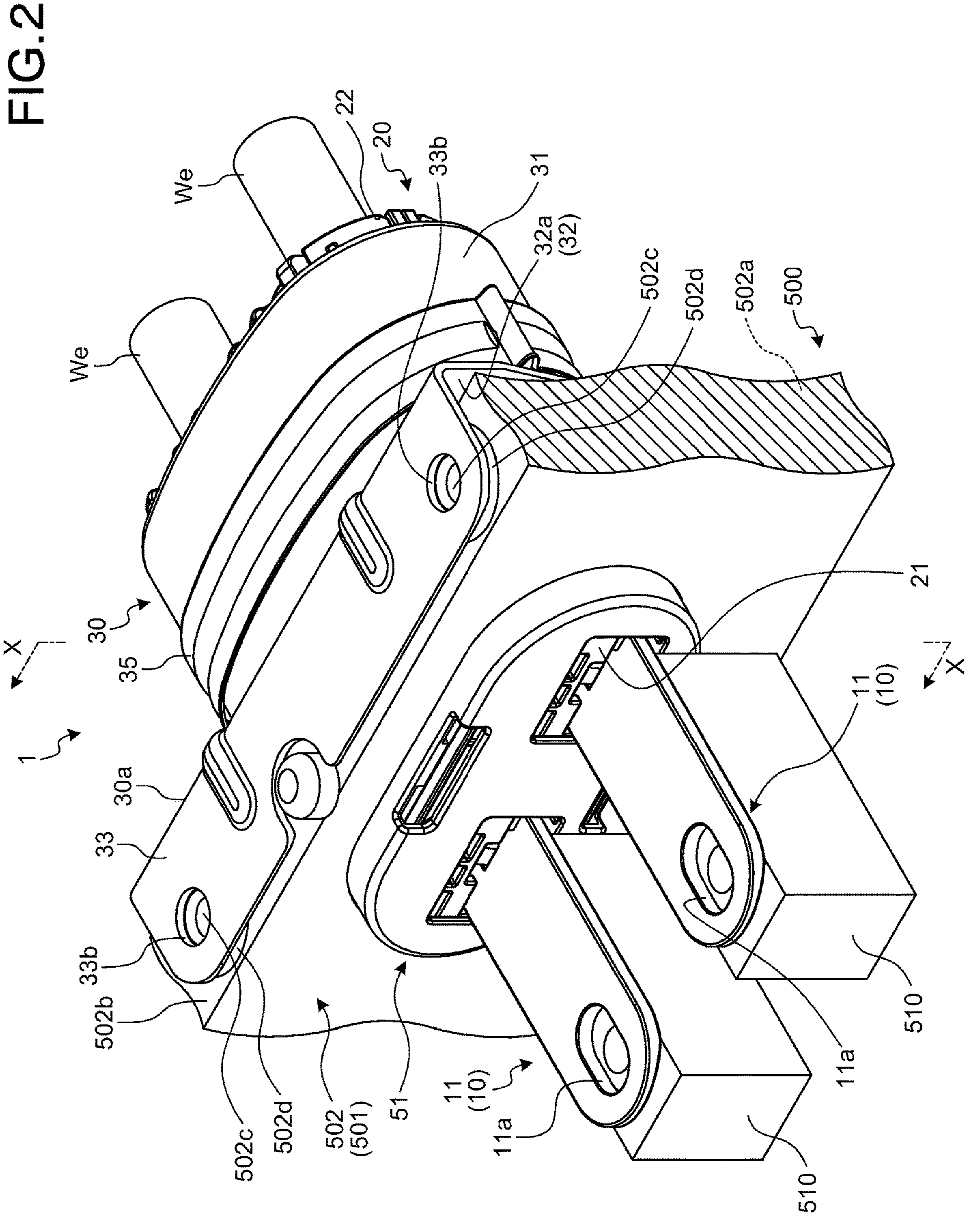
FIG. 2 is a perspective diagram after fitting illustrating the connector of the embodiment.

A reference sign 1 in FIGS. 1 to 5 indicates a connector of the present embodiment. This connector 1 is inserted and fitted into a counterpart fitting part 521 with a bore shape having an inner peripheral wall surface 521*a*, so as to be electrically connected to a counterpart terminal metal fitting 510 (FIGS. 1 and 2). The connector 1 is inserted into and extracted from the counterpart fitting part 521 with a bore shape along a bore axis direction of the counterpart fitting part 521. The counterpart fitting part 521 is formed as a portion that has, for example, a cross section orthogonal to the bore axis direction formed in a circular or elliptical shape.

For example, the connector 1 is electrically connected to the counterpart terminal metal fitting 510 of an counterpart device 500, thereby making an electrical connection between the counterpart device 500 and the device (not illustrated) at the end of the wire We (FIGS. 1 and 2). The counterpart device 500 includes a housing 501 made of metal, and uses a through hole formed in a wall body 502 of the housing 501 (hereinafter referred to as a "counterpart wall body") as the counterpart fitting part 521. The counterpart fitting part 521 has a perpendicular direction to a planar wall surface 502*a* of the counterpart wall body 502 (FIGS. 1 to 4) as a hole axis direction, and has the connector 1 inserted thereinto and removed therefrom along the hole axis direction. The counterpart device 500 includes a terminal block or a counterpart connector (not illustrated) inside its housing 501. The counterpart terminal metal fitting 510 is included in its terminal block or counterpart connector. Therefore, the connector 1 is inserted and fitted into the counterpart fitting part 521 and makes an electrical connection to the terminal block or the counterpart terminal metal fitting 510 of the counterpart connector inside the housing 501.

In the following, when we simply refer to an insertion direction without any special mention, the insertion direction refers to an insertion direction of the connector 1 into the counterpart fitting part 521. In addition, when we simply refer to an extraction direction without any special mention, the extraction direction refers to an extraction direction of the connector 1 with respect to the counterpart fitting part 521. In addition, when we simply refer to an insertion and extraction direction without any special mention, the insertion and extraction direction refers to an insertion and extraction direction of the connector 1 with respect to the counterpart fitting part 521.

This connector 1 includes a terminal metal fitting 10, a housing 20, and a shield shell 30 (FIG. 1 to FIG. 5).

The terminal metal fitting 10 is molded from metal or other conductive material. For example, this terminal metal fitting 10 is molded into a predetermined shape by press forming, such as bending or cutting, on a metal sheet that serves as a base material. The terminal metal fitting 10 is attached to an end of the wire We so as to make an electrical connection to the wire We. The terminal metal fitting 10 will also be electrically connected to the counterpart terminal metal fitting 510. Therefore, the terminal metal fitting 10 has a terminal connecting part 11 that is physically and electrically connected to the counterpart terminal metal fitting 510, and a wire connection part 12 that is physically and electrically connected to the end of the wire We (FIG. 5).

Figure 3:
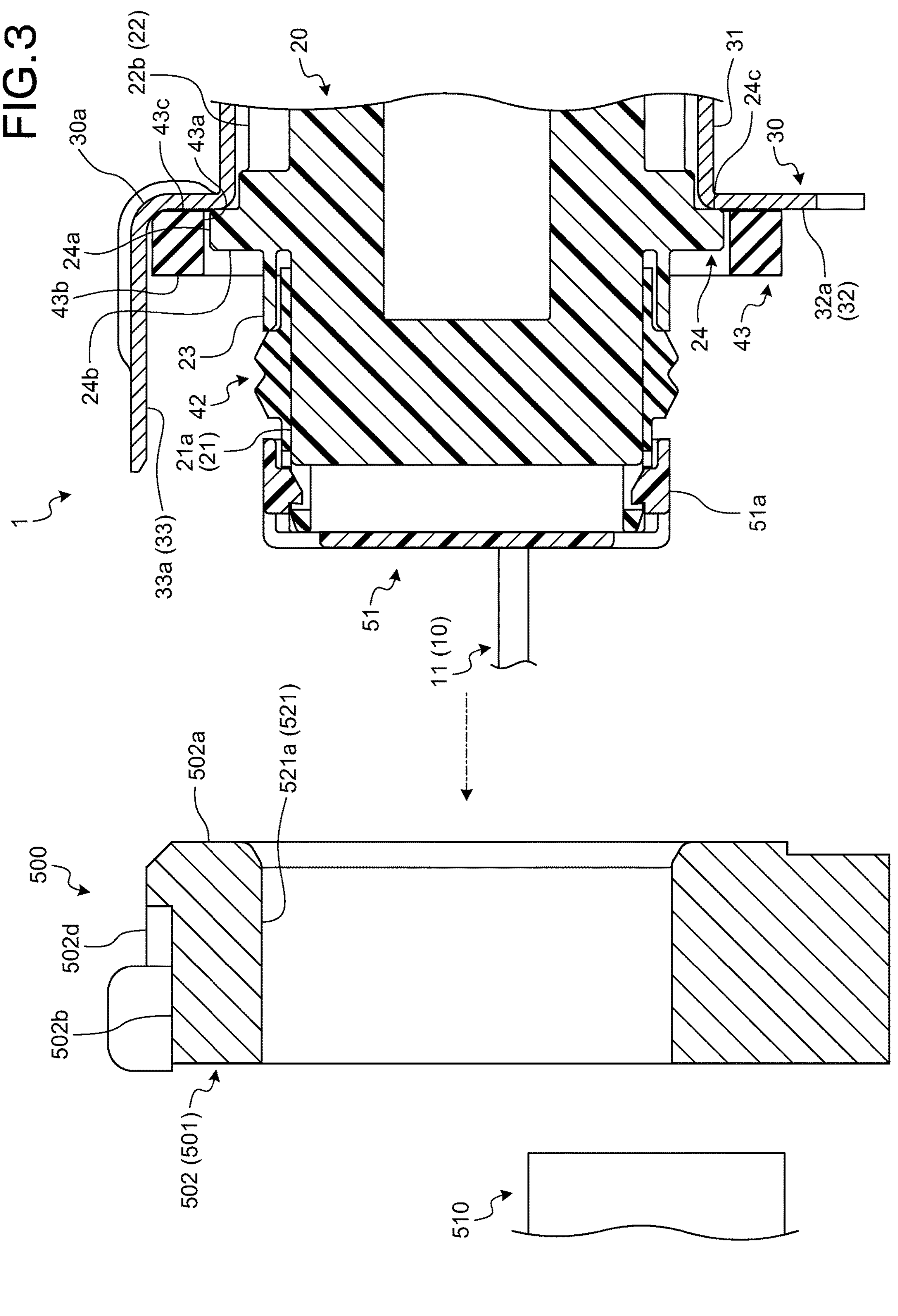
FIG. 3 is an X-X cross-sectional view of FIG. 1.
Figure 4:
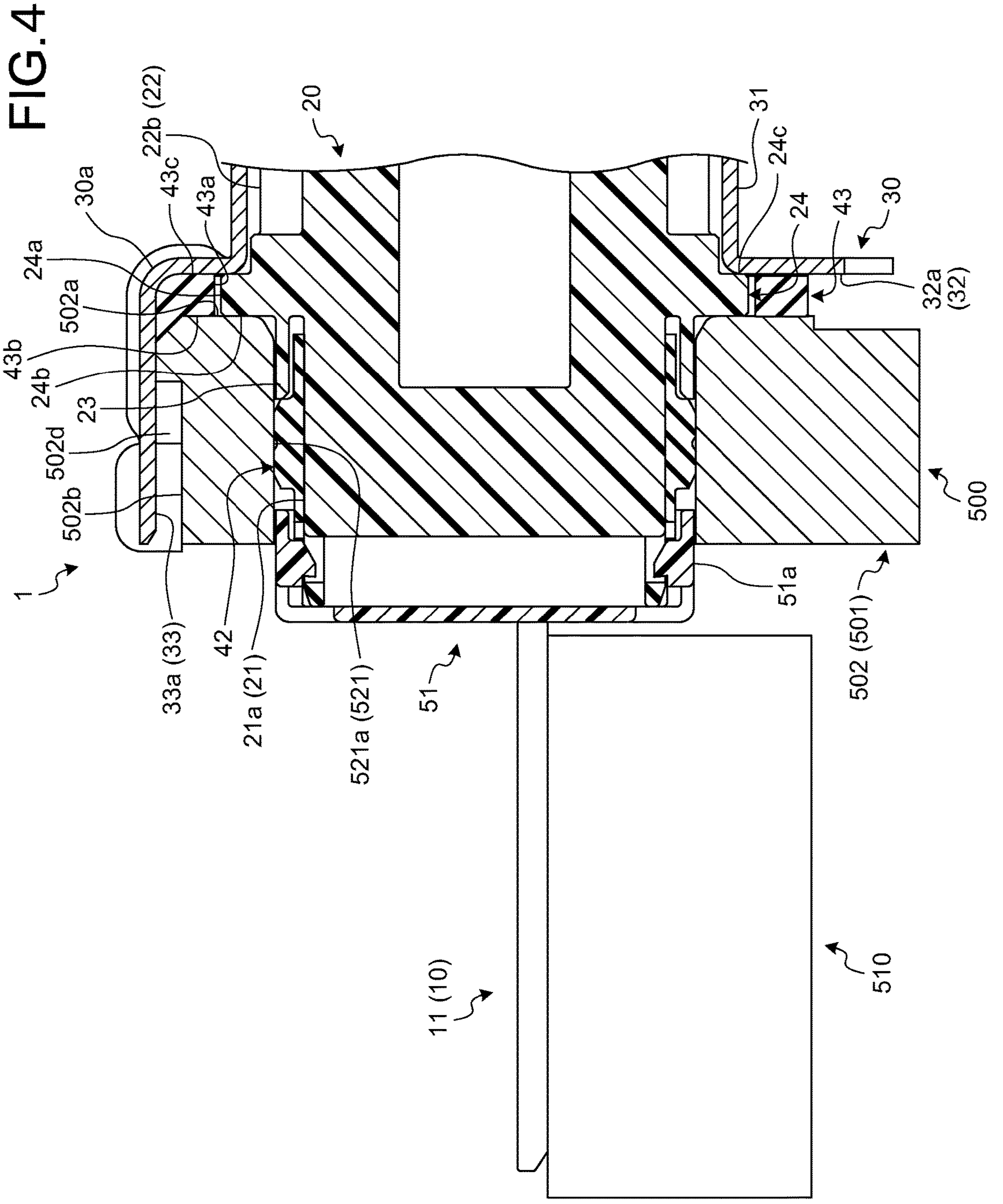
FIG. 4 is an X-X cross-sectional view of FIG. 2.
Figure 5:
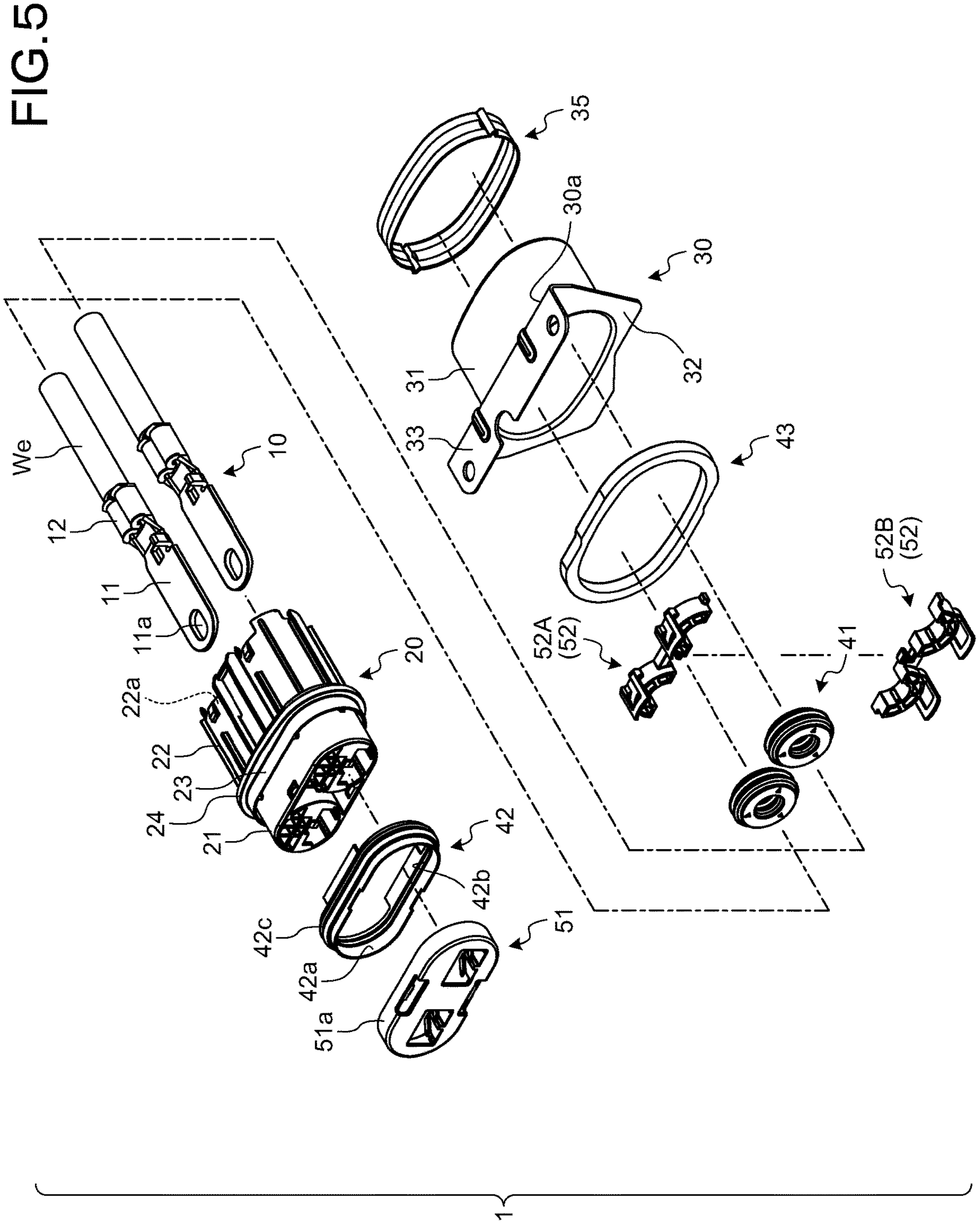
FIG. 5 is an exploded view illustrating the connector of the embodiment.

The terminal connecting part 11 illustrated here is shaped in a chip (FIG. 1 to FIG. 5). The terminal connecting part 11 has a through hole 11*a* (FIG. 1, FIG. 2 and FIG. 5). This terminal connecting part 11 is physically and electrically connected to the counterpart terminal metal fitting 510 by being fixed to the counterpart terminal metal fitting 510 through its through-hole 11*a* using a screw or the like. A connection form between the terminal metal fitting 10 and the counterpart terminal metal fitting 510 does not necessarily have to be of such screwing structure. For example, the terminal metal fitting 10 and the counterpart terminal metal fitting 510 are molded so as to be able to fit and connect with each other, one of which may be molded in a shape of a female terminal and the other of which may be molded in a shape of a male terminal.

The wire connection part 12 is physically and electrically connected to the wire We by being, for example, crimped or welded to a core of the end of the wire We. The wire connection part 12 illustrated here has two barrel pieces crimped to a bare core wire by being pressurized and connected to the core wire.

The terminal metal fitting 10 in this example is molded as a straight shaped terminal metal fitting with the terminal connecting part 11 and the wire connection part 12 thereof arranged in a straight line. Therefore, the wire We is pulled out of the wire connection part 12 in a direction of extension of the terminal metal fitting 10 along its straight line. However, this terminal metal fitting 10 may be a terminal metal fitting having the terminal connecting part 11 and a wire connection part 12 arranged by being crossed one another, for example, by being arranged orthogonally.

The connector 1 illustrated here has two sets of the terminal metal fitting 10 and the wire We in its pair.

The housing 20 is molded from insulating material such as synthetic resin. This housing 20 accommodates inside thereof the terminal metal fitting 10 and the wire We. In this housing 20, the terminal metal fitting 10 is held in an accommodation state as it is, and the wire We is pulled out outward from the inside to the outside thereof.

The housing 20 has a fitting part 21 that accommodates inside thereof the terminal metal fitting 10 and is inserted and fitted into the counterpart fitting part 521 with a bore shape of the counterpart wall body 502 (FIGS. 1 to 6). The fitting part 21 is inserted and fitted into the inside of the counterpart fitting part 521 along the insertion direction, and is pulled out outward from the inside of the counterpart fitting part 521 along an extraction direction that is opposite to the insertion direction. This fitting part 21 is formed in a cylindrical shape with the insertion and extraction direction (insertion direction, and insertion and extraction direction) relative to the counterpart fitting part 521 as a cylinder axis direction. Therefore, the following may refer to the cylinder axis direction instead of the insertion and extraction direction. The fitting part 21 illustrated here is formed in a cylindrical shape such that a cross section orthogonal to the cylinder axis has a shape of an ellipse, and has two terminal metal fittings 10 placed in parallel along the longitudinal direction of the ellipse. The fitting part 21 illustrated here holds the terminal connecting part 11 inside thereof, and the end of the through hole 11*a* side in this terminal connecting part 11 protrudes from the inside to the outside thereof. And the fitting part 21 illustrated here accommodates inside thereof the wire connection part 12 side in the terminal connecting part 11 and the terminal connecting part 11 side in the wire connection part 12. This fitting part 21 has, inside thereof, a partition wall (not illustrated) provided between adjacent terminal metal fittings 10.

The housing 20 has, in a state where the fitting part 21 is inserted and fitted into the counterpart fitting part 521 (hereinafter referred to as a "fitting state"), a portion closer to an extraction direction side relative to the fitting part 21 protruding from the counterpart fitting part 521. The housing 20 has a wire housing section 22 of a cylindrical shape that accommodates, inside thereof, the wire We as a protruding portion from the counterpart fitting part 521 on the extraction direction side (FIGS. 1, 2, 5 and 6). The wire housing section 22 illustrated here is formed in a cylindrical shape and is provided for a corresponding wire We. Wire housing sections 22 are aligned in an array direction of the two terminal metal fittings. The housing 20 has a cylindrical part 23, between the fitting part 21 and the corresponding wire housing section 22, which is coaxial with the cylinder axis of the fitting part 21 and is provided outside an outer peripheral wall surface 21*a* of the fitting part 21 (FIGS. 1 and 3 to 6). The cylindrical part 23 illustrated here is formed in a cylindrical shape such that a cross section orthogonal to the cylinder axis has a shape of an ellipse, and is arranged with an annular gap against the outer peripheral wall surface 21*a* of the fitting part 21.

In this housing 20, the wire We with the terminal metal fitting 10 is inserted through an opening 22*a* of the wire housing section 22 (FIG. 5). Therefore, the wire We is pulled out outward from the opening 22*a*. Here, an annular gap is formed between the wire housing section 22 and the wire We. Therefore, in this connector 1, a watertight member with an annular shape (hereinafter referred to as an "inner watertight member") 41 (FIG. 5) has the wire We inserted thereto in advance, and the inner watertight member 41 is inserted into the wire housing section 22 together with the wire We, thereby sealing the annular gap between the wire housing section 22 and the wire We. That inner watertight member 41 is a so-called rubber plug.

Figure 6:
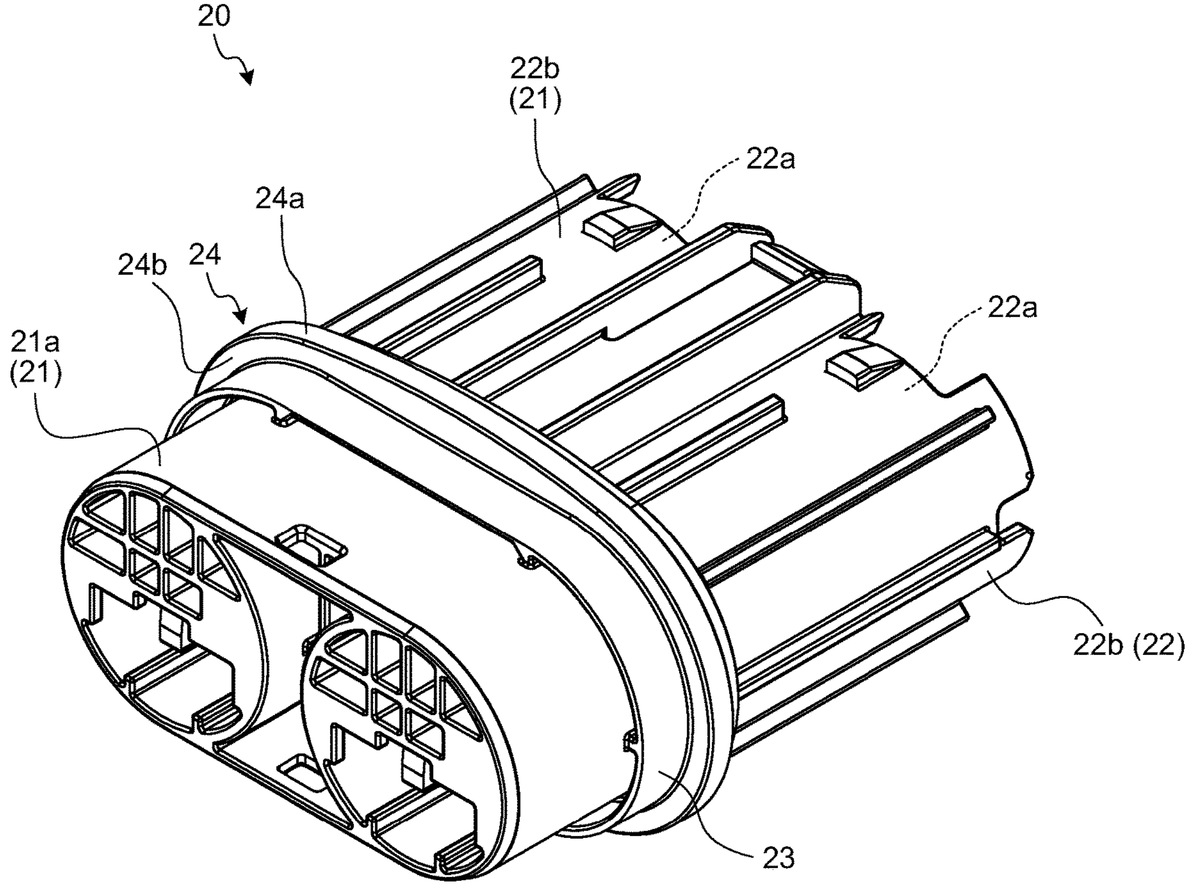
FIG. 6 is a perspective diagram illustrating a housing.

The housing 20 has a flange part 24 with an annular shape that is coaxial with the cylinder axis of the fitting part 21 (hereinafter referred to as a "housing flange part") between the cylindrical part 23 and the corresponding wire housing section 22 as a protruding portion from the counterpart fitting part 521 on the extraction direction side (FIGS. 1 and FIGS. 3 to 6). The housing flange part 24 has an outer peripheral surface 24*a* outside the outer peripheral wall surface 21*a* of the fitting part 21 and outside an outer wall 22*b* of the corresponding wire housing section 22 (FIGS. 3, 4 and 6). The outer peripheral surface 24*a* of the housing flange part 24, illustrated here, is outside the cylindrical part 23. Furthermore, the housing flange part 24 has a contact surface 24*b* with an annular shape that contacts the wall surface 502*a* of the counterpart wall body 502 when in the fitting state (FIGS. 1, 3, 4 and 6). The contact surface 24*b* is a wall surface on an insertion direction side in the housing flange part 24, and contacts a peripheral portion of the counterpart fitting part 521 in the wall surface 502*a* of the counterpart wall body 502.

The connector 1 includes a front holder 51 into which the tip of the fitting part 21 of the housing 20 (the end on the insertion direction side) is inserted inward (FIGS. 1 to 5). The front holder 51 maintains a holding state of the terminal metal fitting 10 housed together with its fitting part 21 and the like in the housing 20. The front holder 51 has a cylindrical part 51*a* the insertion and extraction direction of which is the cylindrical direction, and the tip of the fitting part 21 is inserted into the inside of the cylindrical part 51*a* (FIGS. 3 and 4). The cylindrical part 51*a* illustrated here is formed in a cylindrical shape such that a cross section orthogonal to the cylinder axis has a shape of an ellipse.

In this connector 1, an annular end surface on the extraction direction side in the cylindrical part 51*a* of the front holder 51 and an end surface on the insertion direction side in the cylindrical part 23 of the housing 20 are disposed opposite with each other with an interval therebetween in the insertion and extraction direction. Therefore, in the connector 1, an annular groove is formed between the respective end surfaces of the cylindrical parts 23 and 51*a*, with the outer peripheral wall surface 21*a* of the fitting part 21 as a groove bottom. The connector 1 has a first watertight member with an annular shape (hereinafter referred to as a "first outer watertight member") 42 in the annular groove thereof (FIG. 1 and FIGS. 3 to 5). The first outer watertight member 42 is attached to the outer peripheral wall surface 21*a* of the fitting part 21, and seals the cylindrical gap between the fitting part 21 and the counterpart fitting part 521 when in the fitting state. The first outer watertight member 42 illustrated here is molded as a member to seal a portion in the axial direction in the cylindrical gap.

The first outer watertight member 42 allows the inner peripheral side to adhere to the groove bottom of the annular groove and the outer peripheral side to adhere to the inner peripheral wall surface 521*a* of the counterpart fitting part 521, so as to seal the annular gap between the groove bottom of the annular groove and the inner peripheral wall surface 521*a* of the counterpart fitting part 521, thereby preventing liquid such as water from entering to the inside of the housing 501 from between the fitting part 21 and the counterpart fitting part 521. Therefore, the first outer watertight member 42 is molded from an elastically deformable synthetic resin material such as rubber.

The first outer watertight member 42 has a base 42*a* of a cylindrical shape, a lip 42*b* with an annular shape that is coaxial and protrudes from the inner peripheral surface of the base 42*a* (hereinafter referred to as an "inner peripheral lip"), and a lip 42*c* with an annular shape that protrudes from the outer peripheral surface of the base 42*a* (hereinafter referred to as an "outer peripheral lip") (FIG. 5). In the first outer watertight member 42, a plurality of the inner peripheral lips 42*b* and the outer peripheral lips 42*c* are lined up in the cylinder axis direction of the base 42*a*. The first outer watertight member 42 illustrated here has two inner peripheral lips 42*b* and two outer peripheral lips 42*c*. The base 42*a* illustrated here is formed in a cylindrical shape such that a cross section orthogonal to the cylinder axis has a shape of an ellipse. The inner peripheral lip 42*b* and outer peripheral lip 42*c* illustrated here are each formed in a cylindrical shape such that a cross section orthogonal to the cylinder axis of the base 42*a* is an ellipse.

In addition, the connector 1 has a rear holder 52 assembled thereto between the opening 22*a* of the wire housing section 22 and the inner watertight member 41, so as to hold the wire We while suppressing bending of the wire We (FIG. 5). The rear holder 52 in this example has a two-part structure including a first holder member 52A and a second holder member 52B, and allows the first holder member 52A and the second holder member 52B to clamp and hold the respective wires We. Each wire We is pulled out outward from the opening 22*a* through the rear holder 52. The rear holder 52 is held in the corresponding wire housing section 22 by hooking mooring parts respectively provided in the first holder member 52A and the second holder member 52B on claw parts provided in the wire housing section 22, although not described in detail. The first holder member 52A and the second holder member 52B are molded from insulating materials such as synthetic resin, for example.

The shield shell 30 covers the protruding portions of the housing 20 from the counterpart fitting part 521 on the extraction direction side (the corresponding wire housing section 22 and the corresponding housing flange part 24) from the outside, thereby suppressing intrusion of noise to the wire We inside from the outside. Therefore, the shield shell 30 is molded from a metallic material (e.g., aluminum or aluminum alloy). The shield shell 30 illustrated here is press-formed using a metal plate as a base material.

The shield shell 30 has a cylindrical part 31 that covers the corresponding wire housing section 22 from the outside (FIGS. 1 to 5 and 7). The cylindrical part 31 is formed in a cylindrical shape such that a cross section orthogonal to the cylinder axis is an ellipse, and has two wire housing sections 22 arranged in parallel along a longitudinal direction of the ellipse.

The shield shell 30 has a flange part 32 (hereinafter referred to as a "shell flange part") that protrudes outward beyond the outer peripheral surface of the cylindrical part 31 thereof and is disposed counterpart the wall surface 502*a* of the counterpart wall body 502 with an interval therebetween when in the fitting state (FIGS. 1 to 5 and 7). The shell flange part 32 is molded to have an annular and flat shape that is coaxial with the cylinder axis of the cylindrical part 31, and that protrudes outward beyond the outer peripheral surface of the cylindrical part 31. The shell flange part 32, when in the fitting state, has one plane 32*a* disposed opposite the wall surface 502*a* of the counterpart wall body 502 with an interval therebetween (FIG. 4).

Here, the housing flange part 24 is interposed between the shell flange part 32 and the wall surface 502*a* of the counterpart wall body 502 when in the fitting state (FIGS. 3 and 4). The outer peripheral surface 24*a* of the housing flange part 24 is disposed inside an outer peripheral edge of the shell flange part 32 and outside an inner edge of the shell flange part 32. This allows the housing flange part 24 to have, as described earlier, the contact surface 24*b* on the insertion direction side contact a peripheral portion of the counterpart fitting part 521 in the wall surface 502*a* of the counterpart wall body 502 when in the fitting state. In the housing flange part 24, a wall surface 24*c* with an annular shape on the extraction direction side is disposed opposite the inner edge side in one plane 32*a* of the shell flange part 32 (FIGS. 3 and 4). The inner peripheral side in the one plane 32*a* and the wall surface 24*c* of the housing flange part 24 may be disposed opposite with each other with an interval or without interval therebetween.

The shield shell 30 has a fixed part 33 that is bent from an end of the outer peripheral edge of the shell flange part 32, and is, when in the fitting state, fixed to an end surface 502*b* of the counterpart wall body 502 (FIGS. 1 to 5 and 7).

Here, the end surface 502*b* of the counterpart wall body 502 is a plane that is orthogonally connected to the wall surface 502*a*, and has one plane 33*a* of the fixed part 33 of a flat shape disposed opposite thereto when in the fitting state (FIG. 4). The fixed part 33 illustrated here is bent 90 degrees from the end of the shell flange part 32 so as to be orthogonal to the shell flange part 32. The fixed part 33 illustrated here is fixed to the end surface 502*b* of the counterpart wall body 502 by screwing and fixing. Therefore, the end surface 502*b* of the counterpart wall body 502 has a fixing part 502*c* as a female screw part to fix the fixed part 33 (FIG. 1). The fixing part 502*c* illustrated here has a spacer part 502*d* with an annular shape protruding from the end surface 502*b* of the counterpart wall body 502. The one plane 33*a* in the fixed part 33 is offset from the end surface 502*b* of the counterpart wall body 502 by a thickness of the spacer part 502*d*. The fixed part 33 has a through hole 33*b* formed thereon into which a male screw (not illustrated) is inserted, the male screw being disposed opposite the fixing part 502*c* and screwed into the fixing part 502*c* when the fitting part 21 is inserted and fitted into the counterpart fitting part 521 (FIGS. 1 and 2). Here, two sets of the through hole 33*b* and the fixing part 502*c* in its pair are provided.

The connector 1 includes a braid (not illustrated) that covers the outer peripheral surface of the cylindrical part 31 of the shield shell 30 and the wires We pulled out outward from the openings 22*a* of the respective wire housing sections 22. The braid is a cylindrical and mesh-like braided material made of metallic material, which suppresses the intrusion of noise to the wires We pulled out outward from the respective openings 22*a*. The braid is pressed against the outer peripheral surface of the cylindrical part 31 using a cylindrical connection member 35 (FIGS. 1, 2 and 5).

By the way, in the connector 1, the first outer watertight member 42 described earlier prevents a liquid such as water from entering to the inside of the housing 501 from between the fitting part 21 and the counterpart fitting part 521. And in this connector 1, it is desirable to reduce the amount of liquid flowing into between the fitting part 21 and the counterpart fitting part 521 if liquid tightness therebetween is to be considered. Therefore, the connector 1 has a second watertight member 43 with an annular shape (hereinafter referred to as a "second outer watertight member") that is crushed between the shell flange part 32 and the wall surface 502*a* of the counterpart wall body 502 when in the fitting state (FIGS. 1, 3 to 5, and 7).

That second outer watertight member 43 is disposed outside the housing flange part 24. For example, the second outer watertight member 43 is disposed on the outer peripheral surface 24*a* side of the housing flange part 24 so as to cover the outer peripheral surface 24*a*. The second outer watertight member 43 is disposed on the shell flange part 32 side in the housing flange part 24 so as to be clamped between the housing flange part 24 and the shell flange part 32. The second outer watertight member 43, regardless of a manner of being disposed outside the housing flange part 24, has an inner peripheral surface 43*a* disposed opposite the outer peripheral surface 24*a* of the housing flange part 24, and a pressurized surface 43*b* with an annular shape that protrudes to the insertion direction side beyond the contact surface 24*b* of the housing flange part 24 and that is subjected to a pressing force from the wall surface 502*a* of the counterpart wall body 502 when in the fitting state (FIGS. 1, 3, 4, and 7).

Figure 7:
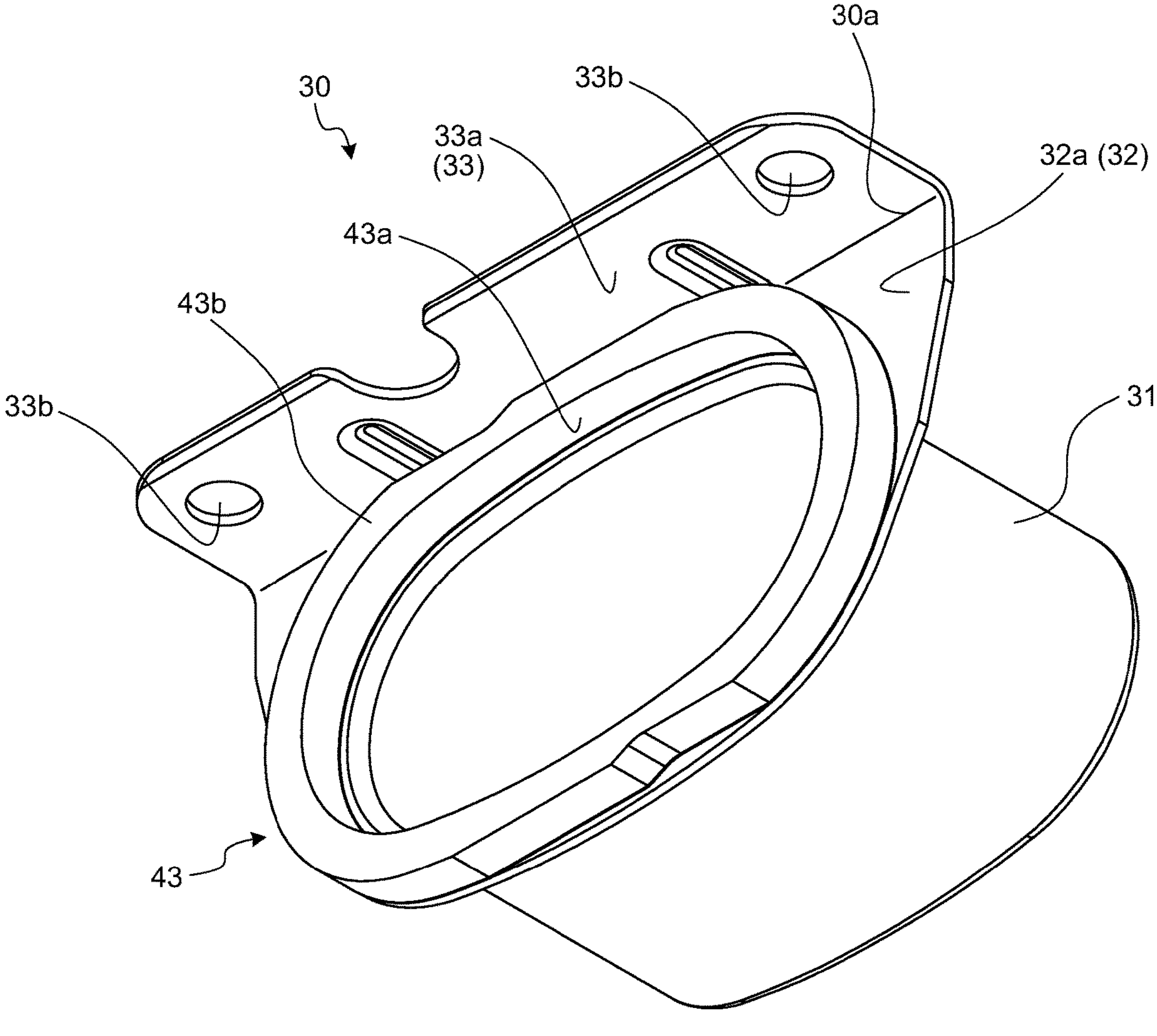
FIG. 7 is a perspective diagram illustrating a shield shell having a second watertight member installed thereon.

The second outer watertight member 43 described here is an annular body that covers the outer peripheral surface 24*a* of the housing flange part 24 on the outer peripheral surface 24*a* side and is attached to the shell flange part 32 of the shield shell 30. The second outer watertight member 43 is molded from an elastically deformable synthetic resin material such as rubber. More specifically, the second outer watertight member 43 is molded using a sponge-like sheet member. The second outer watertight member 43 described here is made of EPDM (ethylene propylene diene rubber) and is molded to have an annular shape that is coaxial with the cylindrical part 31 of the shield shell 30 and that has a cross section orthogonal to the cylinder axis, the cross section being an ellipse (FIG. 7). In the second outer watertight member 43, the inner surface of its elliptical annulus is the above-described inner peripheral surface 43*a*, and the annular wall surface on the insertion direction side in the annulus is the above-described pressurized surface 43*b*. In the second outer watertight member 43, a wall surface 43*c* with an annular shape on the extraction direction side is attached to the one plane 32*a* of the shell flange part 32 using an adhesive or a double-sided tape (FIGS. 3 and 4).

In the connector 1, by inserting and fitting the fitting part 21 into the counterpart fitting part 521, the pressurized surface 43*b* of the second outer watertight member 43 contacts the wall surface 502*a* of the counterpart wall body 502, and by continuing the inserting and fitting, the second outer watertight member 43 is crushed while the pressurized surface 43*b* is subjected to a pressing force from the wall surface 502*a* of the counterpart wall body 502. In the connector 1, by further continuing the inserting and fitting, the contact surface 24*b* of the housing flange part 24 contacts the wall surface 502*a* of the counterpart wall body 502. In this connector 1, when its contact surface 24*b* contacts the wall surface 502*a* of the counterpart wall body 502, the fitting part 21 enters the fitting state where the inserting and fitting thereof is completed, and crushing of the second outer watertight member 43 stops there. As a result, in the connector 1, the second outer watertight member 43 is sandwiched between the one plane 32*a* of the shell flange part 32 and the wall surface 502*a* of the counterpart wall body 502 while being pressurized in the insertion and extraction direction, thereby preventing liquid from entering therebetween from the outside.

Here, the amount of protrusion of the second outer watertight member 43 from the contact surface 24*b* of the housing flange part 24 is, when the shield shell 30 may move relative to the counterpart wall body 502 in the fitting state, desirably greater than, for example, a sum of a maximum value of relative movement amount in the insertion and extraction direction (insertion direction and extraction direction) between the shield shell 30 and the counterpart wall body 502 and a cumulative tolerance of a gap in the insertion and extraction direction (insertion direction and extraction direction) between the one plane 32*a* of the shell flange part 32 and the wall surface 502*a* of the counterpart wall body 502. The cumulative tolerance is a well-known cumulative tolerance that is calculated based on dimensional tolerances of respective components involved in the gap. As a result, in the connector 1, even in a case of, for example, a largest relative movement between the shield shell 30 and the counterpart wall body 502 in the insertion and extraction direction due to an external input during vehicle driving when in the fitting state therebetween, a pressing force can be applied to the pressurized surface 43*b* from the wall surface 502*a* of the counterpart wall body 502, and the second outer watertight member 43 remains crushed, thereby preventing liquid from entering between the one plane 32*a* of the shell flange part 32 and the wall surface 502*a* of the counterpart wall body 502 from the outside. It should be noted that, in the connector 1, instead of the cumulative tolerance, an accumulated tolerance may be used in which the dimensional tolerances of the respective components involved in the gap have been accumulated, so as to determine an amount of protrusion of the second outer watertight member 43.

Furthermore, in the connector 1, the fixed part 33 of the shield shell 30 is fixed to the end surface 502*b* of the counterpart wall body 502 when the connector 1 is in the fitting state. Therefore, when no relative movement occurs between the shield shell 30 and the counterpart wall body 502, the amount of protrusion of the second outer watertight member 43 from the contact surface 24*b* of the housing flange part 24 is larger than the cumulative tolerance of the gap in the insertion and extraction direction (insertion and extraction direction) between the one plane 32*a* of the shell flange part 32 and the wall surface 502*a* of the counterpart wall body 502. As a result, in the connector 1, even if there is a variation in the dimensions of the respective components within a range of the tolerance, a pressing force can be applied from the wall surface 502*a* of the counterpart wall body 502 to the pressurized surface 43*b* when the connector 1 is in the fitting state, and the second outer watertight member 43 remains crushed, thereby preventing liquid from entering between the one plane 32*a* of the shell flange part 32 and the wall surface 502*a* of the counterpart wall body 502 from the outside.

As described above, the connector 1 of the present embodiment includes the second outer watertight member 43 between the shell flange part 32 and the wall surface 502*a* of the counterpart wall body 502, thereby reducing the amount of liquid flowing through a gap therebetween, into a gap between the fitting part 21 and the counterpart fitting part 521. In particular, the connector 1 includes a first outer watertight member 42 between the fitting part 21 and the counterpart fitting part 521, so as to suppress the amount of liquid flowing therebetween, so that the liquid tightness between the fitting part 21 and the counterpart fitting part 521 can be maintained by the first outer watertight member 42.

In the connector according to the present embodiment, by inserting and fitting the fitting part into the counterpart fitting part, a pressurized surface of a second watertight member contacts the wall surface of the counterpart wall body, and by continuing the inserting and fitting, the second watertight member is crushed while the pressurized surface is subjected to a pressing force from the wall surface of the counterpart wall body. In this connector, the inserting and fitting are continued, so that a contact surface of a housing flange part contacts the wall surface of the counterpart wall body. In this connector, when the contact surface of the connector contacts the wall surface of the counterpart wall body, the connector enters a fitting state where the inserting and fitting of the fitting part is completed, and crushing of the second watertight member stops there. As a result, in this connector, the second watertight member is sandwiched between the shell flange part and the wall surface of the counterpart wall body while the second watertight member is pressurized in an insertion and extraction direction, thereby preventing liquid from the outside from entering therebetween. Therefore, the connector according to the present invention includes the second watertight member between the shell flange part and the wall surface of the counterpart wall body, thereby reducing the amount of liquid flowing through a gap therebetween, into a gap between the fitting part and the counterpart fitting part.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal metal fitting attached to an end of a wire;

a housing having a fitting part that accommodates the terminal metal fitting inside thereof and that is inserted and fitted into a counterpart fitting part with a bore shape of a counterpart wall body;

a shield shell including a cylindrical part that covers, from outside, a protruding portion of the housing that protrudes from the counterpart fitting part on an opposite side of an insertion direction of the fitting part to the counterpart fitting part, and a shell flange part that protrudes outward beyond a first outer peripheral surface of the cylindrical part and is disposed opposite a wall surface of the counterpart wall body with an interval therebetween;

a first watertight member with an annular shape that is attached to an outer peripheral wall surface of the fitting part and covers a cylindrical gap between the fitting part and the counterpart fitting part in a fitting state where the fitting part is inserted and fitted into the counterpart fitting part; and a second watertight member with an annular shape that is crushed between the shell flange part and the wall surface of the counterpart wall body when in the fitting state, wherein the housing has a housing flange part that is interposed between the shell flange part and the wall surface of the counterpart wall body when in the fitting state, and a second outer peripheral surface is disposed inside an outer edge of the shell flange part and outside an inner edge of the shell flange part, the housing flange part has a contact surface with an annular shape that contacts the wall surface of the counterpart wall body when in the fitting state, the second watertight member is disposed outside of the housing flange part and has an inner peripheral surface disposed opposite the second outer peripheral surface of the housing flange part and a pressurized surface with an annular shape that protrudes to the insertion direction side beyond the contact surface of the housing flange part and is subjected to a pressing force from the wall surface of the counterpart wall body when in the fitting state, and the second watertight member is attached to the shell flange part.

2. The connector according to claim 1, wherein an amount of protrusion from the contact surface of the housing flange part in the second watertight member is greater than a sum of a maximum value of relative movement amount in the insertion direction between the shield shell and the counterpart wall body and a cumulative tolerance of a gap in the insertion direction between the shell flange part and the wall surface of the counterpart wall body.

3. The connector according to claim 1, wherein the shield shell has a fixed part that is bent from an end of the outer peripheral edge of the shell flange part and fixed to an end surface of the counterpart wall body.

4. The connector according to claim 1, wherein the second watertight member is made of an ethylene propylene diene rubber.

5. The connector according to claim 2, wherein the second watertight member is made of an ethylene propylene diene rubber.

6. The connector according to claim 3, wherein the second watertight member is made of an ethylene propylene diene rubber.

* * * * *